UNITED STATES PATENT OFFICE.

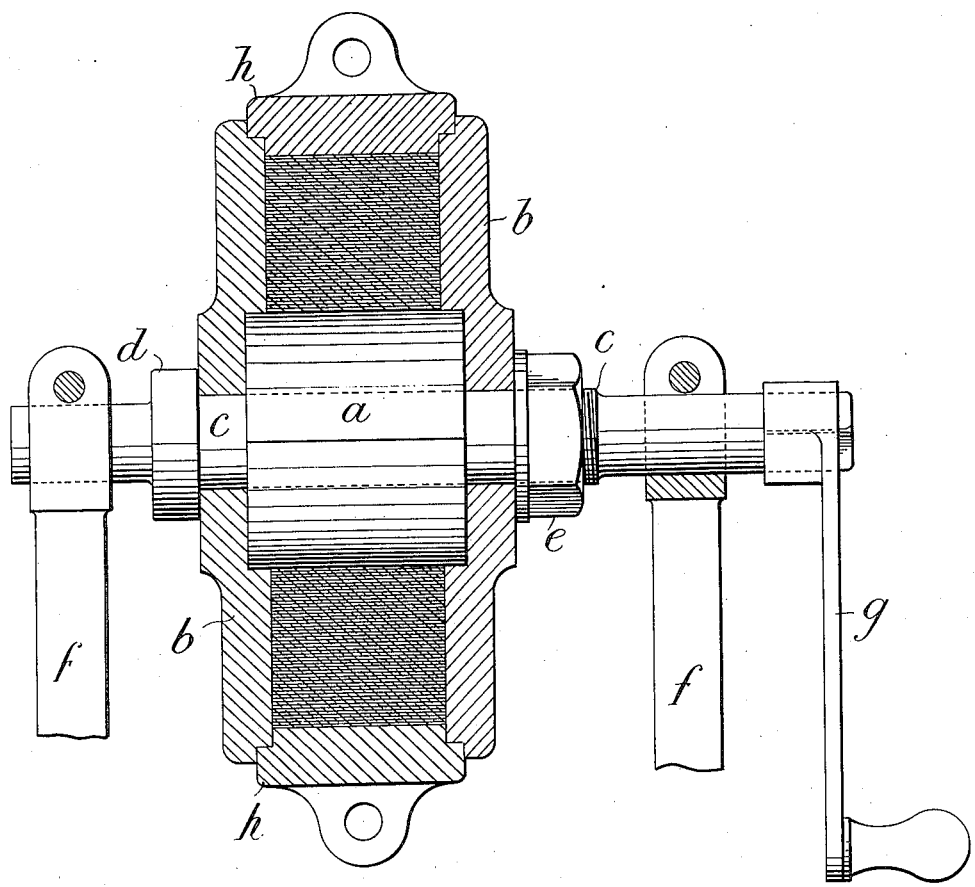

ALFRED GEORGE SPENCER, OF LONDON, ENGLAND.

METHOD OF MANUFACTURING RUBBER BLOCKS FOR SPRINGS, &c.

1,092,129. Specification of Letters Patent. Patented Mar. 31, 1914.

Application filed August 21, 1913. Serial No. 785,849.

*To all whom it may concern:*

Be it known that I, ALFRED GEORGE SPENCER, a subject of the King of Great Britain and Ireland, residing at London, England, have invented Improvements in Methods of Manufacturing Rubber Blocks for Springs, &c., of which the following is a specification.

This invention relates to the manufacture of buffer, draw, bearing or other springs and elastic diaphragms.

According to this invention strips or bands of rubber partially cured are wound or otherwise suitably arranged in juxtaposition while under tension and are so retained while being further cured in order to effect the union of the strips or bands. In some cases in springs according to this invention, strip rubber is wound under tension on a center portion of rubber or upon a mandrel.

The rubber strips or bands under tension can be wound or assembled to constitute the desired spring when the further curing is effected, or the springs can be cut from a suitable block or body of rubber so produced.

In springs or spring elements of the well known kind comprising rubber rings or the like in which plates are molded, the rubber rings or the like can be built up of strips or bands wound under tension as hereinbefore described and arranged in proper combination with the metal plates in the molds wherein they are further cured in order to unite the rubber and metal.

Diaphragms may be made of slices or thin layers cut from a solid cylindrical block of rubber produced by winding a strip or strips of partially cured rubber in tension on a mandrel or a core of rubber and then further curing the cylinder so formed, the slices or thin layers being cut transversely to the axis of the cylinder. The central part of such a diaphragm tends to bulge in one direction or the other.

Springs produced by winding a rubber strip on a core or mandrel, or by merely assembling rubber strips or bands, and then vulcanizing them, it may be under pressure, to effect the union of the strips or bands are not to be confused with my improved springs, for in a spring according to this invention the strips or bands are in tension when placed in position for the final curing and are held in tension throughout such curing operation.

The length of a rubber cylinder as ordinarily constructed for making springs corresponds to the width of the uncured rubber strip from which it is formed as such strip leaves the calendering rollers, whereas in manufacturing my improved springs when employing strip rubber, the said strip is first cured sufficiently to change it from its plastic nature to a state in which it has definite tensile strength and it is then wound under tension sufficient to visibly and definitely reduce the width of the strip, the finished cylinder being of a length decidedly less than the width of the partially cured strip from which the cylinder is formed.

Apparatus suitable for winding partially cured rubber strip under tension and for holding it in such condition while being further cured conveniently comprises, as shown in sectional elevation in the accompanying drawing, a collapsible metal core $a$ consisting of a number of segments, the ends of which fit into annular grooves formed in two metal side plates $b$. Passing axially through the core $a$ is a spindle $c$ on which is fitted a collar or fixed nut $d$ at one side and a nut $e$ working on a screwed portion of the spindle at the other side, by means of which the two side plates $b$ can be screwed up and held in position. The spindle extends some distance beyond the core at both ends, so that it can be supported in bearing brackets $f$ and one end of the spindle is squared to take a handle $g$ for use in winding. The rubber strip after being wound on the core $a$ to the required diameter is surrounded by a metal clamping ring $h$ made in two parts which can be bolted together. When ready for final curing, the handle $g$ is removed and the apparatus lifted from the bearing brackets $f$ and placed in the heater. After vulcanization the ring $h$ is removed, the nut $e$ unscrewed, the plates $b$ forced apart, and the collapsible core $a$ removed. The core $a$ should be larger in diameter than the hole required to allow for the contraction due to the tension.

What I claim is:—

The herein described method of manufacturing a circular block or mass of vulcanized rubber adapted for the uses set forth, consisting in winding under tension a partially cured strip or band of rubber, and completing the curing of the mass while the convolutions are under tension and in contact with each other, thereby producing a homogeneous mass or block.

Signed at 77 Cannon street, London, England, this twelfth day of August 1913.

ALFRED GEORGE SPENCER.

Witnesses:
RICHARD J. GASCODINE,
W. HENRY SIMMS.